US009542645B2

(12) United States Patent
Gupta et al.

(10) Patent No.: US 9,542,645 B2
(45) Date of Patent: Jan. 10, 2017

(54) PLASTIC SYNAPSE MANAGEMENT

(71) Applicant: QUALCOMM Incorporated, San Diego, CA (US)

(72) Inventors: Vikram Gupta, San Diego, CA (US); Sarah Paige Gibson, San Diego, CA (US); Jeffrey Alexander Levin, San Diego, CA (US); Ravindra Manohar Patwardhan, San Diego, CA (US); Avijit Chakraborty, San Diego, CA (US); William Howard Constable, San Diego, CA (US); William Richard Bell, II, Carlsbad, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 415 days.

(21) Appl. No.: 14/228,078

(22) Filed: Mar. 27, 2014

(65) Prior Publication Data
US 2015/0278683 A1 Oct. 1, 2015

(51) Int. Cl.
*G06N 5/00* (2006.01)
*G06N 3/04* (2006.01)
*G06N 3/08* (2006.01)

(52) U.S. Cl.
CPC .. *G06N 3/08* (2013.01); *G06N 3/04* (2013.01)

(58) Field of Classification Search
CPC .......... G06N 3/049; G06N 3/08; G06N 3/063; G06N 3/04
See application file for complete search history.

(56) References Cited

U.S. PATENT DOCUMENTS

| 7,496,546 | B2 | 2/2009 | Hoya | |
|---|---|---|---|---|
| 2003/0208451 | A1 | 11/2003 | Liaw | |
| 2007/0022063 | A1 | 1/2007 | Lightowler | |
| 2010/0235310 | A1 | 9/2010 | Gage et al. | |
| 2013/0073494 | A1* | 3/2013 | Modha | G06N 3/049 706/25 |
| 2013/0073501 | A1 | 3/2013 | Hunzinger et al. | |
| 2014/0058988 | A1* | 2/2014 | Lai | G06N 3/049 706/14 |
| 2015/0178617 | A1* | 6/2015 | Canoy | G06N 3/049 706/25 |

OTHER PUBLICATIONS

Iglesias J., et al., "Dynamics of Pruning in Simulated Large-Scale Spiking Neural Networks", BioSystems, vol. 79, No. 1-3, Nov. 17, 2004 (Nov. 17, 2004), pp. 11-20, XP027606684, DOI: 10.1016/j.biosystems.2004.09.016.
International Search Report and Written Opinion—PCT/US2015/021240—ISA/EPO—Dec. 22, 2015.

(Continued)

*Primary Examiner* — Stanley K Hill
*Assistant Examiner* — Kalpana Bharadwaj
(74) *Attorney, Agent, or Firm* — Seyfarth Shaw LLP

(57) ABSTRACT

A method for managing synapse plasticity in a neural network includes converting a first set of synapses from a plastic synapse type to a fixed synapse type. The method may also include converting a second set of synapses from the fixed synapse type to the plastic synapse type.

20 Claims, 13 Drawing Sheets

(56) References Cited

OTHER PUBLICATIONS

Nageswaran J.M., et al., "A Configurable Simulation Environment for the Efficient Simulation of Large-Scale Spiking Neural Networks on Graphics Processors", Neural Networks, Elsevier Science Publishers, Barking, GB, vol. 22, No. 5-6, Jul. 1, 2009 (Jul. 1, 2009), pp. 791-800, XP026446158.
Renaud S., et al., "PAX: A Mixed Hardware/Software Simulation Platform for Spiking Neural Networks", Neural Networks, Elsevier Science Publishers, Barking, GB, vol. 23, No. 7, Sep. 1, 2010 (Sep. 1, 2010), pp. 905-916, XP027160165, ISSN: 0893-6080 [retrieved on Jul. 20, 2010].
Wijekoon J.H.B., et al., "Heterogeneous Neurons and Plastic Synapses in a Reconfigurable Cortical Neural Network IC", IEEE International Symposium on Circuits and Systems, May 1, 2012 (May 1, 2012), pp. 2417-2420, XP055233864, DOI: 10.1109/ISCAS.2012.6271786, ISBN: 978-1-4673-0217-3.

\* cited by examiner

PLASTIC SYNAPSE MANAGEMENT

BACKGROUND

Field

Certain aspects of the present disclosure generally relate to neural system engineering and, more particularly, to systems and methods for managing plastic synapses.

Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome. Thus, it is desirable to provide a neuromorphic receiver that may improve the use of fixed synapses and plastic synapses.

SUMMARY

In one aspect of the present disclosure, a method for managing synapse plasticity in a neural network is disclosed. The method includes converting a first set of synapses from a plastic synapse type to a fixed synapse type and/or converting a second set of synapses from the fixed synapse type to the plastic synapse type.

Another aspect of the present disclosure is directed to an apparatus including means for determining a number of plastic synapse types defined for a system. The apparatus also includes means for converting a first set of synapses from a plastic synapse type to a fixed synapse type and/or means for converting a second set of synapses from the fixed synapse type to the plastic synapse type In another aspect of the present disclosure, a computer program product for managing synapse plasticity in a neural network having a non-transitory computer-readable medium is disclosed. The computer readable medium has non-transitory program code recorded thereon which, when executed by the processor(s), causes the processor(s) to perform operations of converting a first set of synapses from a plastic synapse type to a fixed synapse type and/or converting a second set of synapses from the fixed synapse type to the plastic synapse type.

Another aspect of the present disclosure is directed to a neural network having a memory and at least one processor coupled to the memory. The processor(s) is configured to convert a first set of synapses from a plastic synapse type to a fixed synapse type and/or convert a second set of synapses from the fixed synapse type to the plastic synapse type Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System, Training and Operation

Figure 1:
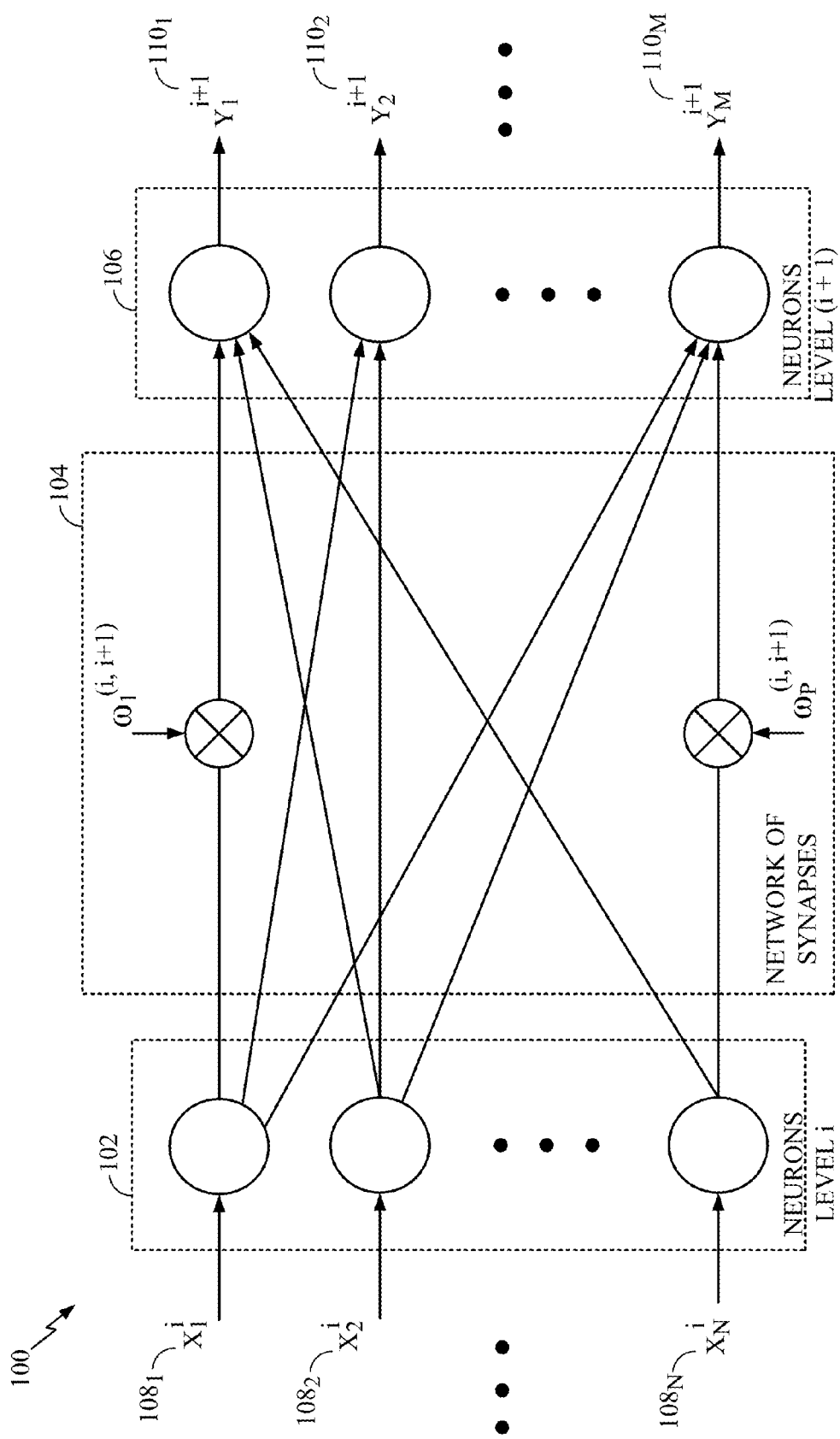
FIG. 1 illustrates an example network of neurons in accordance with certain aspects of the present disclosure.

FIG. 1 illustrates an example artificial neural system 100 with multiple levels of neurons in accordance with certain aspects of the present disclosure. The neural system 100 may have a level of neurons 102 connected to another level of neurons 106 through a network of synaptic connections 104 (i.e., feed-forward connections). For simplicity, only two levels of neurons are illustrated in FIG. 1, although fewer or more levels of neurons may exist in a neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106). In some modeling approaches, the neuron may continuously transfer a signal to the next level of neurons. This signal is typically a function of the membrane potential. Such behavior can be emulated or simulated in hardware and/or software, including analog and digital implementations such as those described below.

In biological neurons, the output spike generated when a neuron fires is referred to as an action potential. This electrical signal is a relatively rapid, transient, nerve impulse, having an amplitude of roughly 100 mV and a duration of about 1 ms. In a particular embodiment of a neural system having a series of connected neurons (e.g., the transfer of spikes from one level of neurons to another in FIG. 1), every action potential has basically the same amplitude and duration, and thus, the information in the signal may be represented only by the frequency and number of spikes, or the time of spikes, rather than by the amplitude. The information carried by an action potential may be determined by the spike, the neuron that spiked, and the time of the spike relative to other spike or spikes. The importance of the spike may be determined by a weight applied to a connection between neurons, as explained below.

The transfer of spikes from one level of neurons to another may be achieved through the network of synaptic connections (or simply "synapses") 104, as illustrated in FIG. 1. Relative to the synapses 104, neurons of level 102 may be considered presynaptic neurons and neurons of level 106 may be considered postsynaptic neurons. The synapses 104 may receive output signals (i.e., spikes) from the level 102 neurons and scale those signals according to adjustable synaptic weights $w_1^{(i,i+1)}, \ldots, w_P^{(i,i+1)}$ where P is a total number of synaptic connections between the neurons of levels 102 and 106 and i is an indicator of the neuron level. In the example of FIG. 1, i represents neuron level 102 and i+1 represents neuron level 106. Further, the scaled signals may be combined as an input signal of each neuron in the level 106. Every neuron in the level 106 may generate output spikes 110 based on the corresponding combined input signal. The output spikes 110 may be transferred to another level of neurons using another network of synaptic connections (not shown in FIG. 1).

Biological synapses can mediate either excitatory or inhibitory (hyperpolarizing) actions in postsynaptic neurons and can also serve to amplify neuronal signals. Excitatory signals depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching a threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, where synaptic weight changes may relate to changes of the memristor resistance. With nanometer feature-sized memristors, the area of a neuron circuit and synapses may be substantially reduced, which may make implementation of a large-scale neural system hardware implementation more practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, where a particular functionality may be based on synaptic weights stored in a memory card currently attached to the neural processor.

Figure 2:
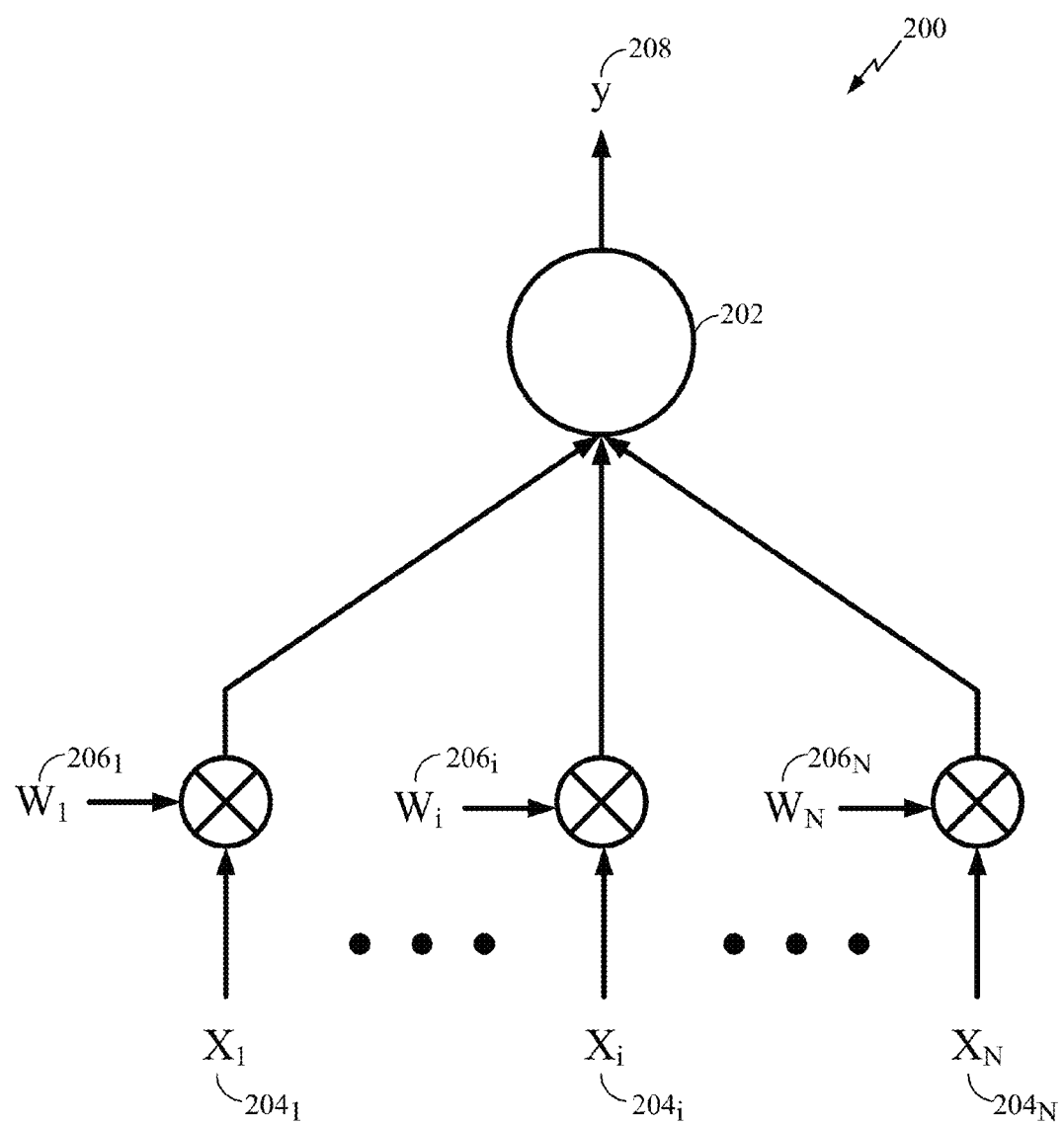
FIG. 2 illustrates an example of a processing unit (neuron) of a computational network (neural system or neural network) in accordance with certain aspects of the present disclosure.

FIG. 2 illustrates an exemplary diagram 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$, which may be signals external to the neural system, or signals generated by other neurons of the same neural system, or both. The input signal may be a current, a conductance, a voltage, a real-valued, and/or a complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($W_1$-$W_N$), where N may be a total number of input connections of the neuron 202.

The neuron 202 may combine the scaled input signals and use the combined scaled inputs to generate an output signal 208 (i.e., a signal Y). The output signal 208 may be a current, a conductance, a voltage, a real-valued and/or a complex-valued. The output signal may be a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by electrical connections with synaptic circuits. The processing unit 202 and its input and output connections may also be emulated by a software code. The processing unit 202 may also be emulated by an electric circuit, whereas its input and output connections may be emulated by a software code. In an aspect, the processing unit 202 in the computational network may be an analog electrical circuit. In another aspect, the processing unit 202 may be a digital electrical circuit. In yet another aspect, the processing unit 202 may be a mixed-signal electrical circuit with both analog and digital components. The computational network may include processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Those skilled in the art will appreciate that examples of the learning rule include, but are not limited to the spike-timing-dependent plasticity (STDP) learning rule, the Hebb rule, the Oja rule, the Bienenstock-Copper-Munro (BCM) rule, etc. In certain aspects, the weights may settle or converge to one of two values (i.e., a bimodal distribution of weights). This effect can be utilized to reduce the number of bits for each synaptic weight, increase the speed of reading and writing from/to a memory storing the synaptic weights, and to reduce power and/or processor consumption of the synaptic memory.

Synapse Type

In hardware and software models of neural networks, the processing of synapse related functions can be based on synaptic type. Synapse types may be non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of multiple types is that processing can be subdivided. For example, non-plastic synapses may not require plasticity functions to be executed (or waiting for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables, formulas, or parameters for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) s structural plasticity (i.e., an amount of delay change) may be a direct function of pre-post spike time difference. Alternatively, structural plasticity may be set as a function of the weight change amount or based on conditions relating to bounds of the weights or weight changes. For example, a synapse delay may change only when a weight change occurs or if weights reach zero but not if they are at a maximum value. However, it may be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity." Consequently, inputs that might be the cause of the postsynaptic neuron's excitation are made even more likely to contribute in the future, whereas inputs that are not the cause of the postsynaptic spike are made less likely to contribute in the future. The process continues until a subset of the initial set of connections remains, while the influence of all others is reduced to an insignificant level.

Because a neuron generally produces an output spike when many of its inputs occur within a brief period (i.e., being cumulative sufficient to cause the output), the subset of inputs that typically remains includes those that tended to be correlated in time. In addition, because the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a presynaptic neuron to a postsynaptic neuron as a function of time difference between spike time $t_{pre}$ of the presynaptic neuron and spike time $t_{post}$ of the postsynaptic neuron (i.e., $t=t_{post}-t_{pre}$). A typical formulation of the STDP is to increase the synaptic weight (i.e., potentiate the synapse) if the time difference is positive (the presynaptic neuron fires before the postsynaptic neuron), and decrease the synaptic weight (i.e., depress the synapse) if the time difference is negative (the postsynaptic neuron fires before the presynaptic neuron).

In the STDP process, a change of the synaptic weight over time may be typically achieved using an exponential decay, as given by:

$$\Delta w(t) = \begin{cases} a_+ e^{-t/k_+} + \mu, t > 0 \\ a_- e^{t/k_-}, t < 0 \end{cases} \quad (1)$$

where $k_+$ and $k_-$ $\tau_{sign(\Delta t)}$ are time constants for positive and negative time difference, respectively, $a_+$ and $a_-$ are corresponding scaling magnitudes, and $\mu$ is an offset that may be applied to the positive time difference and/or the negative time difference.

Figure 3:
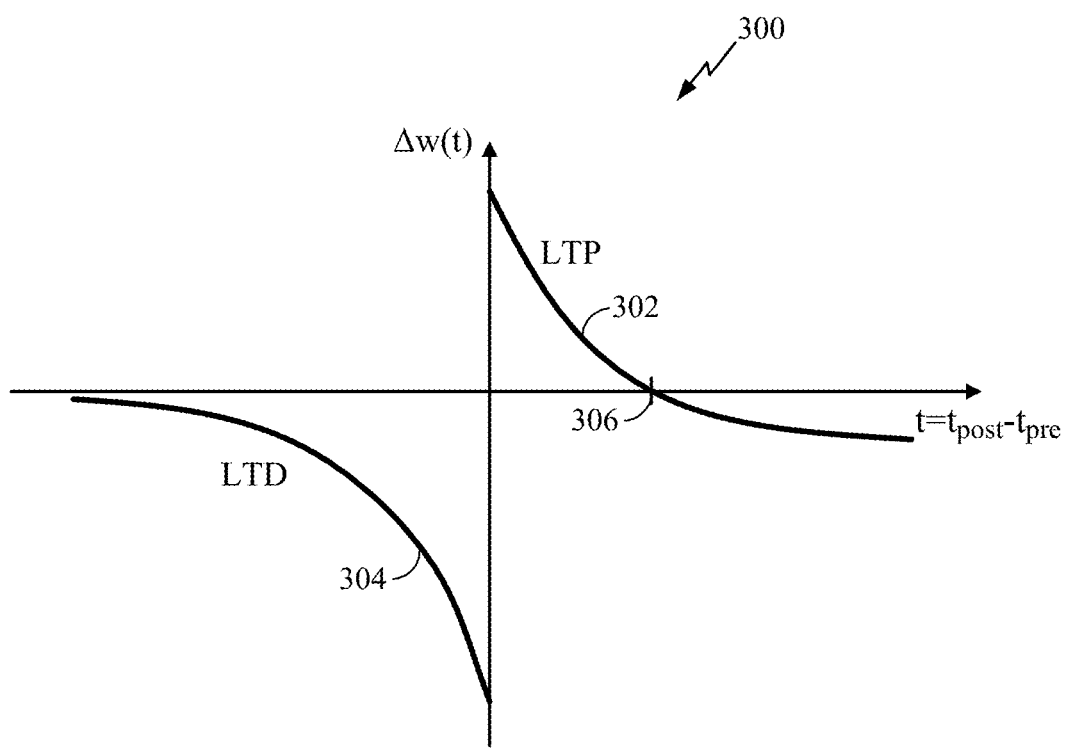
FIG. 3 illustrates an example of spike-timing dependent plasticity (STDP) curve in accordance with certain aspects of the present disclosure.

FIG. 3 illustrates an exemplary diagram 300 of a synaptic weight change as a function of relative timing of presynaptic and postsynaptic spikes in accordance with the STDP. If a presynaptic neuron fires before a postsynaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between presynaptic and postsynaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1. In the case of a frame-based input (i.e., an input that is in the form of a frame of a particular duration comprising spikes or pulses), the offset value $\mu$ can be computed to reflect the frame boundary. A first input spike (pulse) in the frame may be considered to decay over time either as modeled by a postsynaptic potential directly or in terms of the effect on neural state. If a second input spike (pulse) in the frame is considered correlated or relevant to a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any), can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics:

$$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ is a synaptic weight for the synapse connecting a presynaptic neuron m to a postsynaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a postsynaptic neuron is established until the time when the postsynaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e.:

$$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in a biologically-consistent linear fashion. The time constant in the supra-threshold regime, positive by convention, reflects anti-leaky channel dynamics generally driving a cell to spike while incurring latency in spike-generation.

Figure 4:
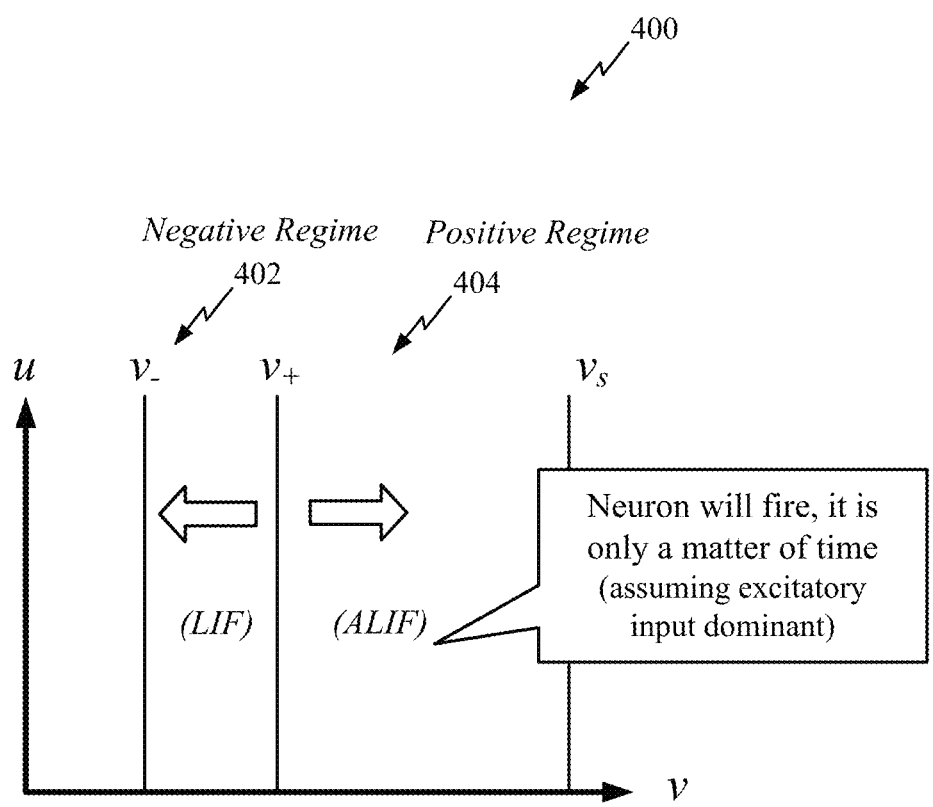
FIG. 4 illustrates an example of a positive regime and a negative regime for defining behavior of a neuron model in accordance with certain aspects of the present disclosure.

As illustrated in FIG. 4, the dynamics of the model 400 may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as:

$$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are:

$$q_\rho = -\tau_\rho \beta u - v_\rho \quad (7)$$

$$r = \delta(v + \epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter $\delta$ is a scale factor controlling the slope of the u null-cline. The parameter $\epsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model may be defined to spike when the voltage v reaches a value $v_S$. Subsequently, the state may be reset at a reset event (which may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time required to reach a particular state. The close form state solutions are:

$$v(t + \Delta t) = (v(t) + q_\rho)e^{\frac{\Delta t}{\tau_\rho}} - q_\rho \quad (11)$$

$$u(t + \Delta t) = (u(t) + r)e^{-\frac{\Delta t}{\tau_u}} - r \quad (12)$$

Therefore, the model state may be updated only upon events, such as an input (presynaptic spike) or output (postsynaptic spike). Operations may also be performed at any particular time (whether or not there is input or output).

Moreover, by the momentary coupling principle, the time of a postsynaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by:

$$\Delta t = \tau_\rho \log \frac{v_f + q_\rho}{v_0 + q_\rho} \quad (13)$$

If a spike is defined as occurring at the time the voltage state v reaches $v_S$, then the closed-form solution for the amount of time, or relative delay, until a spike occurs as measured from the time that the voltage is at a given state v is:

$$\Delta t_S = \begin{cases} \tau_+ \log \frac{v_s + q_+}{v + q_+} & \text{if } v > \hat{v}_+ \\ \infty & \text{otherwise} \end{cases} \quad (14)$$

where $\hat{v}_-$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Improved Management of Plastic Synapses

Typically, a limit may be placed for the number of plastic synapse types specified for hardware in a neural model. As an example, hardware may be limited to sixteen plastic synapse types. In some cases, the number of plastic synapse types defined for a neural model is greater than the hardware limit. Moreover, in some cases, the system may prevent simultaneously enabling all synapses for plasticity. As an example, the plasticity of the synapses may be turned off by setting a parameter in a hardware spike-timing-dependent plasticity (STDP) table. In another example, the synaptic weight updated in the hardware STDP table may be modified.

In one configuration, the w_mix parameter in the STDP table may be set to zero. W_mix is a scale factor applied to the calculated weight change during plasticity. For example, weight_new=weight_old+weight_change*w_mix. Therefore, to turn off plasticity for a synapse type, w_mix may be set to zero in that synapse type's table entry. In this example, even though the plasticity calculations still take place, the calculations would be multiplied by zero, resulting in no weight change.

Still, there may be unused synapse types specified in the hardware synapse table. Thus, it is desirable to provide a system for resource management to convert plastic synapses to fixed synapses when a synapse is not specified to be used for training. Alternatively, or in addition, the resource manager may convert fixed synapses to plastic synapses.

In one configuration, a user may specify the objects that are currently being trained. The information provided by the user may be used to determine the set of synapses specified to be plastic. That is, plastic synapses may be used for the trained object and one or more of the plastic synapses for the untrained objects may be converted to fixed for the untrained synapses. In one configuration, the training of an object can be pre-scheduled, such as being scheduled via a training framework script, or dynamic, such as being model performance based.

Figure 5:
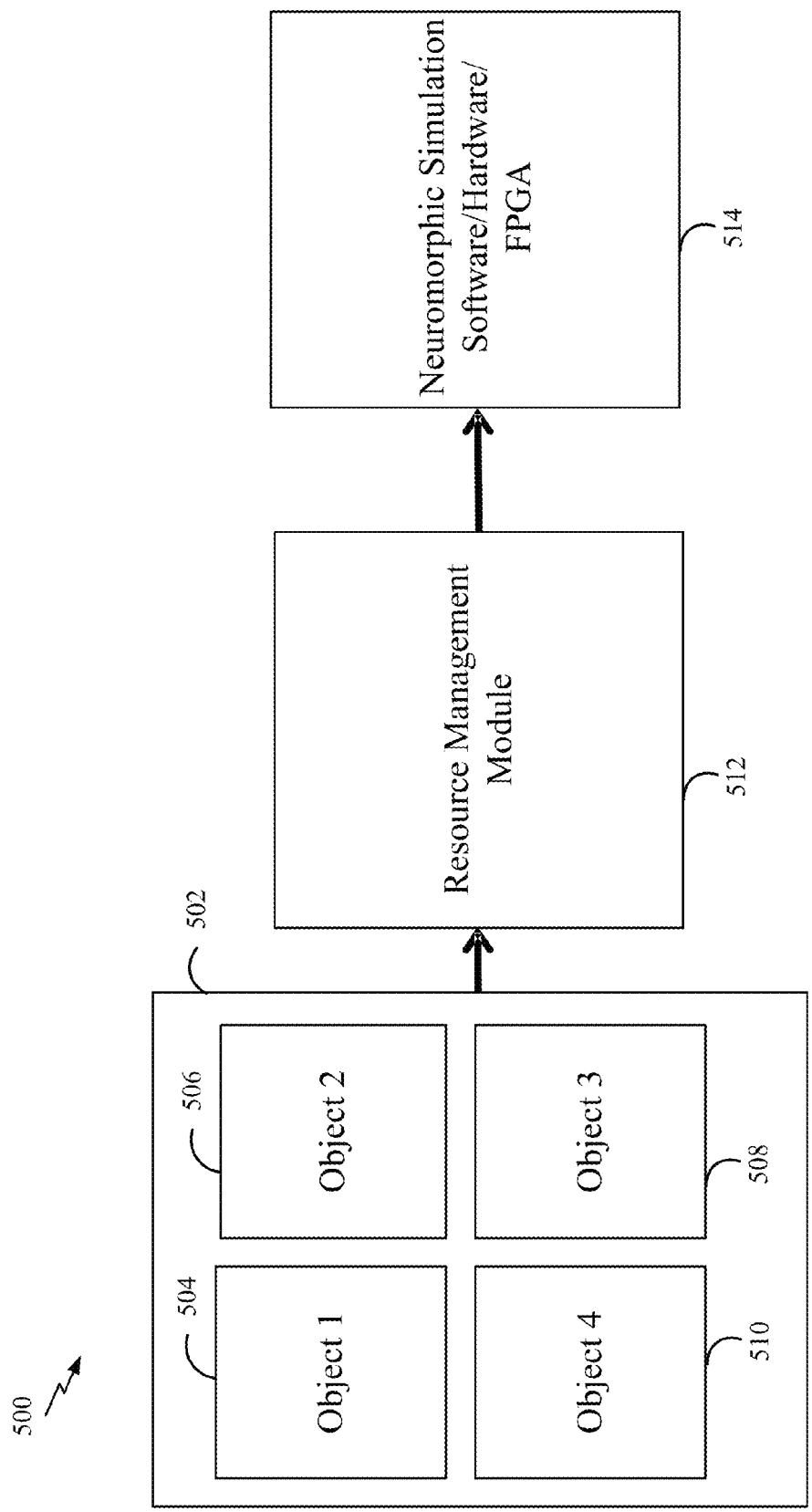
FIGS. 5, 6, 7A, and 7B illustrate examples of a neural network in accordance with aspects of the present disclosure.

FIG. 5 illustrates an example of a neural model 500 according to an aspect of the present disclosure. The neural model 500 may include a high-level network description (HLND) 502 that includes one or more objects 504-510 that are to be trained. The high-level network description 502 may be software or hardware. The neural model 500 may also include a resource management module 512. The resource management module 512 may be associated with a neuromorphic development kit (NDK). Furthermore, the neural model 500 may include neuromorphic simulation software, hardware, and/or a field programmable gate array (FPGA) 514.

In one configuration, a user may specify the objects 504-510 that are to be trained. For example, the first object 504 may be associated with a vision neural model, the second object 506 may be associated with a cognition neural model, the third object 508 may be associated with a motor neural model, and the fourth object 510 may be associated with an auditory neural model. Thus, in the present example, the user may specify that the first object 504 is being trained and the other objects 506-510 are not being trained. Therefore, synapse instances from one or more of the plastic synapse types or the objects 506-510 that are not being trained may be converted from plastic to fixed.

It should be noted that the hardware STDP table includes information for the plastic synapse type. There may be multiple instances of a synapse type, spanning multiple objects. When choosing a synapse type for transition from plastic to fixed, the system should determine that there are no other instances of the selected plastic synapse type in the unused objects, such as objects 506-510.

As previously discussed, not all objects may be concurrently trained. Therefore, even though a total number of plastic synapse types in a model may exceed a hardware limit, synapses belonging to one or more of the plastic synapse types for the objects that are not currently being trained may be converted to fixed synapses. For example, a user may disable training in a first object while training a second object. Thus, in the present example, plasticity for the synapses for the second objects should be enabled while the second objects is being trained and synapses belonging to one or more of the plastic synapse types for the first object may be converted to fixed synapses. The enabling/disabling of objects and/or plasticity of synapses may occur at smaller granularities. For example, V1 plasticity may be turned off while the V2 (temporal layer) is being trained.

In one configuration, when a plastic synapse type is not being used by an object, the resource management module may change one or more synapses belonging to the unused plastic synapse type to a fixed synapse. Alternatively, or in addition, the resource management module may change the weight in one or more instances of the synapse belonging to the unused plastic synapse type. Still the delay of each synapse instance may remain unchanged. Moreover, the resource management module may store the original synapse type and the dopamine enabled flag as meta data. Furthermore, the resource management module may load the new model for simulation. Finally, the resource management module may turn off logging for synaptic weights and/or delays.

In another configuration, fixed synapses may be changed to plastic synapses. The fixed synapses may have been plastic synapses that were changed to fixed synapses and/or fixed synapses that were originally designated as fixed synapses. The change from the fixed synapse to the plastic synapse may be specified by using the stored meta data.

It should be noted that in the present application the synapses may be changed based on the object and/or the synapse type. In the present application, plastic synapse types are defined as plastic synapses associated with one or more parameters. The parameters may determine the nature of plasticity updates for that synapse, such as STDP curves or dopamine enable. Furthermore, other parameters may affect non-plasticity functions such as current delivery. For example, the parameter psp_gain is a scale factor on the current or weight delivered to the postsynaptic cell.

In some cases, the memory usage may increase when separate parameters are specified for each plastic synapse instance. Therefore, in the interest of reducing memory usage and/or improving performance, plastic synapse instances may be grouped to plastic synapse types. Each synapse in a plastic synapse type shares the same parameters with the other synapses in the same plastic synapse type. Moreover, each plastic synapse instance is associated with a plastic synapse type number. The plastic synapse type number may serve as a pointer to the table of plastic synapse parameters.

The number of synapses to convert may be based on various criteria. As an example, there may be seventeen plastic synapse types and the hardware may have a threshold (i.e., limit) of sixteen plastic synapse types. Moreover, in the present example, for the given training instance, only four plastic synapse types are specified. In one configuration, the resource management module may convert the thirteen unused plastic synapse types to fixed synapses. That is, the resource management module may reduce/minimize the number of plastic synapse types present in the hardware.

In yet another configuration, the resource management module may only convert the synapses of a plastic synapse type to a fixed synapse to meet the hardware threshold. In this configuration, the synapse of the one synapse type to be converted may be selected based on various criteria. It should be noted that writing to hardware, reading from hardware, and/or converting plastic synapses to fixed synapses (and vice versa) may reduce system performance. For example, the system performance may be reduced due to an interruption in processing of the neural program. Therefore, system performance may be improved by reducing the number of synapses that are converted while still meeting the hardware threshold.

In one configuration, the resource manager selects the synapse type with the least number of synapses instances. In another configuration, the resource manager selects the synapse type that has the longest interval between training periods. In yet another configuration, the resource manager changes all plastic synapse types that do not need to be plastic. In still another configuration, the resource manager does not make any changes if the number of plastic synapse type is less than the hardware limit. In another configuration, the resource manager selects the number of plastic synapse types based on a computation time. That is, the computation time increases based on the number of plastic synapses. Thus, in one example, the system may select an increased number of plastic synapses to convert to fixed synapses to reduce the computation time. In another configuration, the resource manager selects the number of plastic synapse types based on power management. Finally, in another configuration, the resource manager selects the synapse types based on a user input. The resource manager may select the number of synapse types to convert based on any combination of the aforementioned configurations and is not limited to only selecting the number of synapse types to convert based on one of the previously discussed configurations.

In some cases, a synapse type may be used by two or more objects. Therefore, in one configuration, the system may perform a check to determine if converting a synapse type will affect objects that are either being trained or not being trained. For example, a synapse type may be present in both a first object and a second object. In this example, the first object may be currently being trained and the second object is not currently being trained. Accordingly, because a synapse type is present in both the first object and the second object, synapses from this synapse type may not be changed to fixed synapses in the second object because the synapse type may be being used for the training of the first object. That is, in one configuration, the system does not blindly convert synapse types. Rather, the system performs a check to determine if converting a synapse will affect objects that are either being trained or not being trained.

In one configuration, a bit is specified for each neuron instance. The bit may be used to enable/disable plasticity related computation in the neuron. In the present configuration, when all synapses from a neuron are changed to fixed, the bit may be disabled. For a software implementation, the performance of the system may improve. Alternatively, for a hardware implementation, the power saving may improve.

Typically, if plasticity is changed in one synapse type, an entire model should to be rewritten to hardware. Thus, based on one configuration, the resource manager specifies for a partial recomputed model to be written to hardware. That is, in one configuration, the objects of the recomputed model are independently written as long as interfaces with other objects are not modified. Moreover, in another configuration, one or more parts of the resource manager may be implemented in hardware.

Figure 6:
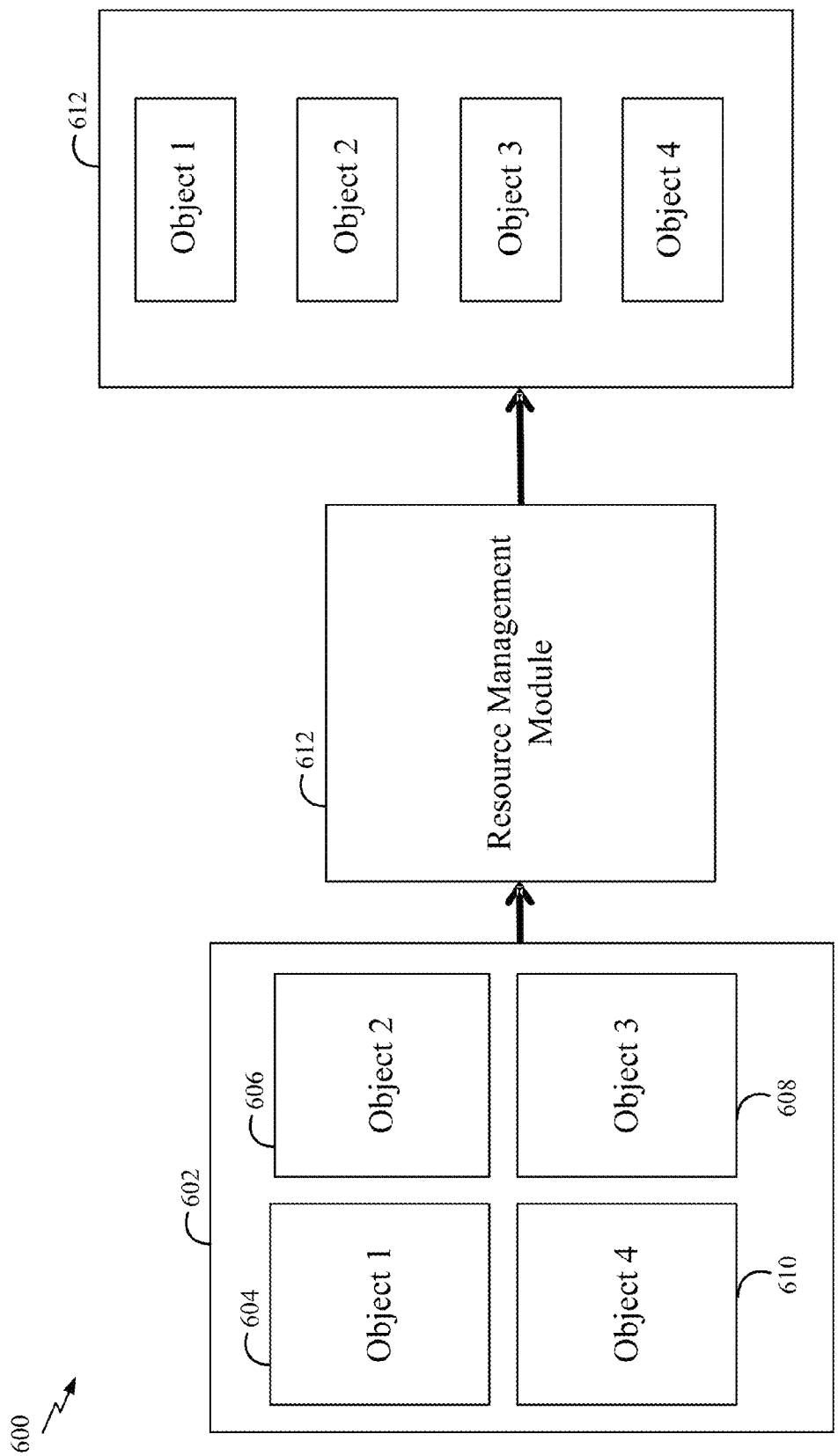

FIG. 6 illustrates a block diagram of a software and hardware implementation of a neural model 600 according to an aspect of the present disclosure. As shown in FIG. 6, the neural model 600 includes a high-level network description 602 that includes four objects 604-610 that are to be trained. The neural model 600 also includes a resource management module 612. In one configuration, the high-level network description 602 is a software model. In the present configuration, as an example, the user indicates that the first object 604 is being trained. Therefore, because only the first object 604 is being trained, the software changes synapses belonging to one or more of the plastic synapse types of the other objects 606-610 to fixed synapses so that the number of plastic synapse types is less than or equal to the hardware threshold for the number of plastic synapse types. Moreover, the resource management module then writes the objects 604-610 to the hardware 614. Still, the mapping of synapses, such as the synapses that have been changed from plastic to fixed, is retained externally in the resource management module and/or the high-level network description software.

That is, in the present configuration, the hardware 614 is agnostic to the change in plasticity of the synapses. Specifically, the hardware 614 is unaware of the mapping of the synapses, such as the synapses that have been changed from plastic to fixed, and is only aware of the state of the synapses specified by the resource management module 612.

In another configuration, the hardware 614 may also include a resource management module (not shown). In this configuration, the user indicates the object that is being trained. Moreover, the resource management module of the hardware may perform the rewrite operation to change synapses belonging to one or more of the plastic synapse types of the objects that are not being trained to fixed synapses so that the number of plastic synapse types is less than or equal to the hardware threshold for the number of plastic synapse types. That is, the hardware resource management module receives an object state, such as plastic or fixed, and rewrites the objects in the hardware 614.

Figure 7A:
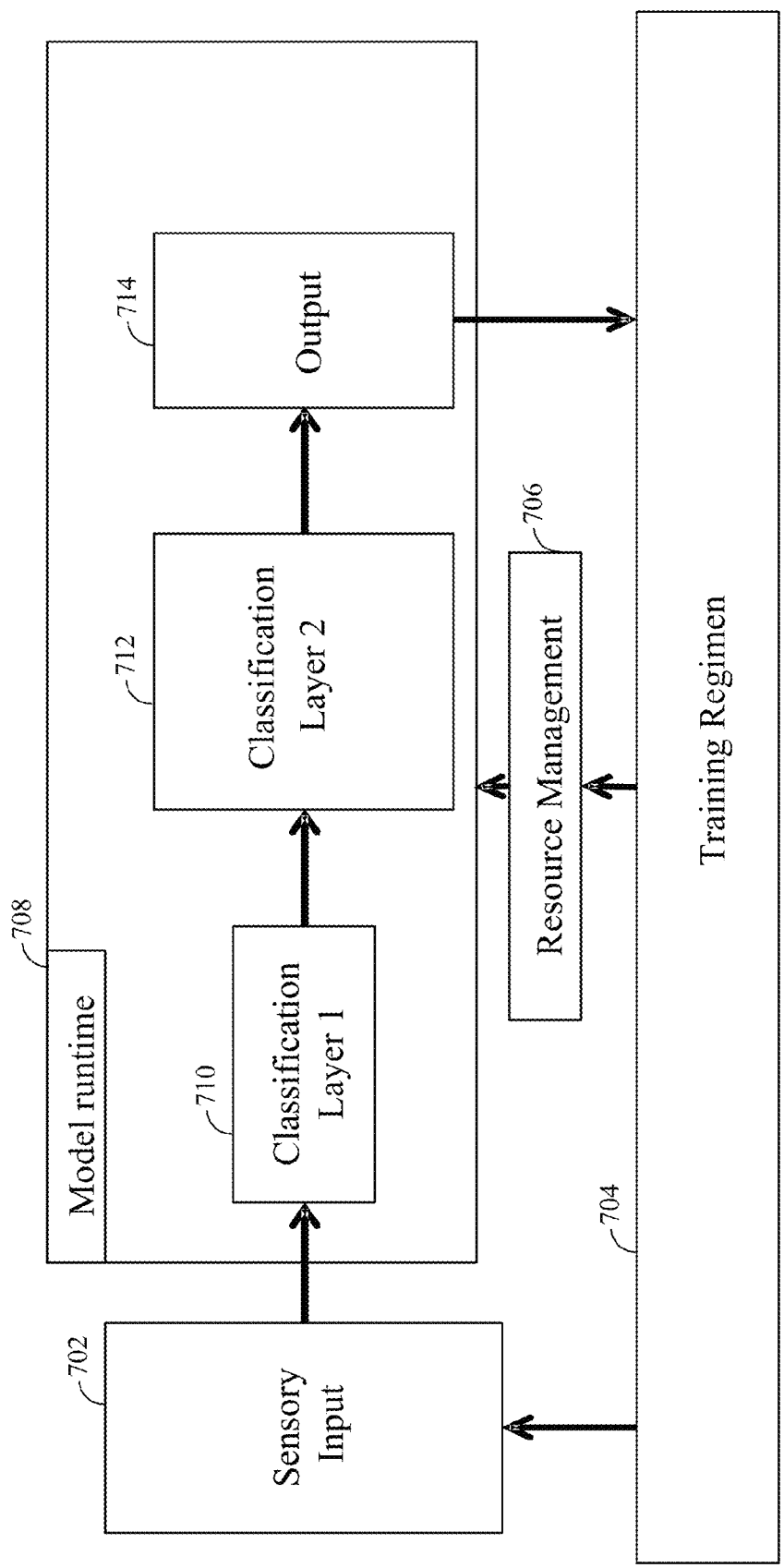
Figure 7B:
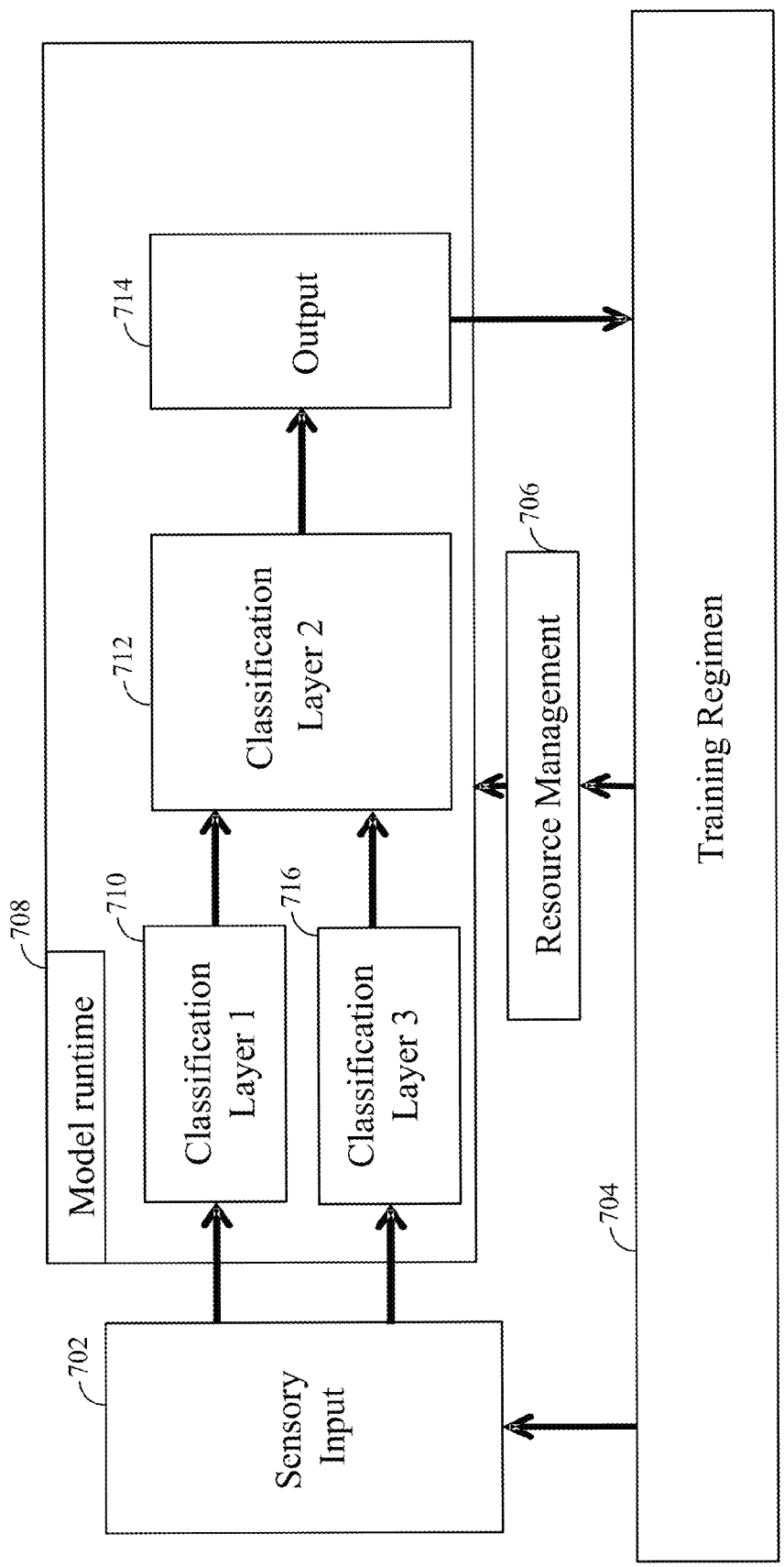

FIGS. 7A and 7B illustrate examples of a system including resource management module according to an aspect of the present disclosure. As shown in FIG. 7A, a system may include sensory inputs 702, a training regimen 704, a resource management module 706, and a module runtime 708. The module runtime may include a first classification layer 710, a second classification layer 712, and an output 714.

In one configuration, the resource management module monitors the performance of the classification layers. In the present configuration, if the performance of the classification layer is less than a threshold, then the number of neurons of the layer may be increased. The layer may refer to an object.

As an example, the resource management module 706 of FIG. 7A may determine that the performance of the first classification layer 710 is below a threshold and may increase the number of neurons in the first classification layer 710. Specifically, as shown in FIG. 7B a third classification layer 716 is added when the performance of a classification layer, such as the first classification layer 710, is less than a threshold. The added classification layer increased the neurons of the layer with a performance that was less than a threshold.

Accordingly, as shown in FIG. 7B, the addition of the third classification layer 716 increases (e.g., doubles) the inputs to the second classification layer 712. In one configuration, when the third classification layer 716 is added, the weight of synapses connecting 710 and 712 are reduced. For example, the weight may be reduced by a factor of two. The weight reduction may normalize the input into the second classification layer 712. Alternatively, or in addition to, the weight of synapses between sensory inputs 702 and the first classification layer 710 may be reduced. Furthermore, the weight of synapses between sensory inputs 702 and the third classification layer 716 may also be reduced. The weight reduction may normalize the output the second classification layer 712 and the third classification layer 716.

In one configuration, if the second classification layer 712 is further subdivided in layers of neurons, then synaptic weights in one or more of the layers preceding the output neurons of the second classification layer 712 may be reduced while maintaining the synaptic weights between the first classification layer 710 and the second classification layer 712. The synaptic weights of other preceding layers may also be maintained. The weight reduction may normalize the output of the layers. Still, in the FIG. 7, the second classification layer 712 is illustrated as a classification layer.

Furthermore, alternatively, or in addition to, in one configuration, properties of neurons or synapses within the second classification layer 712 are be changed. For example, $v_+$ may be increased to normalize for increased inputs. Alternatively, weights of synapses within the sub-layers of the second classification layer 712 may be reduced.

In another configuration, due to the increase of inputs to the second classification layer 712, the weight of the synapses from the first classification layer 710 may be reduced. For example, the weight may be reduced such that the new weight is half of the previous weight. In one configuration, the weights for synapses for only the first layer are reduced. In another configuration, the weights for synapses for the first and additional layers are reduced.

Figure 8:
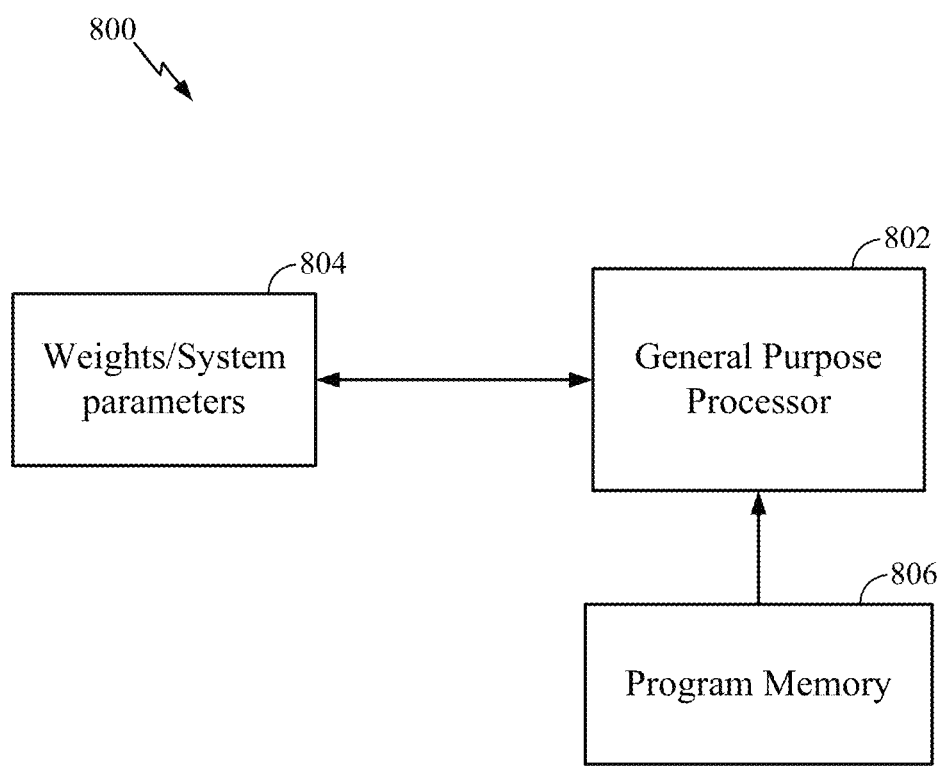
FIG. 8 illustrates an example implementation of designing a neural network using a general-purpose processor in accordance with certain aspects of the present disclosure.

FIG. 8 illustrates an example implementation 800 of the aforementioned synapse conversion using a general-purpose processor 802 in accordance with certain aspects of the present disclosure. Variables (neural signals), synaptic weights, system parameters associated with a computational network (neural network), delays, and frequency bin information may be stored in a memory block 804, while instructions executed at the general-purpose processor 802 may be loaded from a program memory 806. In an aspect of the present disclosure, the instructions loaded into the general-purpose processor 802 may comprise code for converting one or more of, a first set of synapses from a plastic synapse type to a fixed synapse type, a second set of synapses from the fixed synapse type to the plastic synapse type, or a combination thereof.

Figure 9:
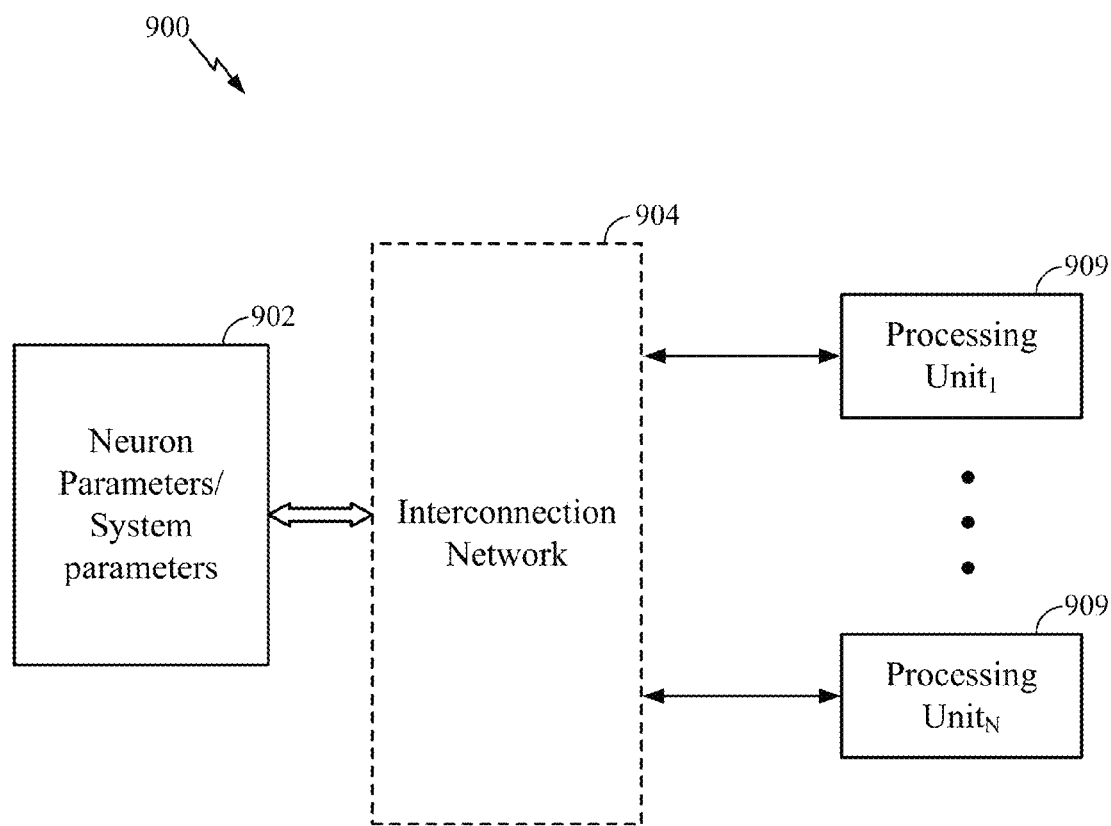
FIG. 9 illustrates an example implementation of designing a neural network where a memory may be interfaced with individual distributed processing units in accordance with certain aspects of the present disclosure.

FIG. 9 illustrates an example implementation 900 of the aforementioned synapse conversion where a memory 902 can be interfaced via an interconnection network 904 with individual (distributed) processing units (neural processors) 909 of a computational network (neural network) in accordance with certain aspects of the present disclosure. Variables (neural signals), synaptic weights, system parameters associated with the computational network (neural network) delays, frequency bin information, and/or synapse conversion information may be stored in the memory 902, and may be loaded from the memory 902 via connection(s) of the interconnection network 904 into each processing unit (neural processor) 909. In an aspect of the present disclosure, the processing unit 909 may be configured to convert one or more of, a first set of synapses from a plastic synapse type to a fixed synapse type, a second set of synapses from the fixed synapse type to the plastic synapse type, or a combination thereof.

Figure 10:
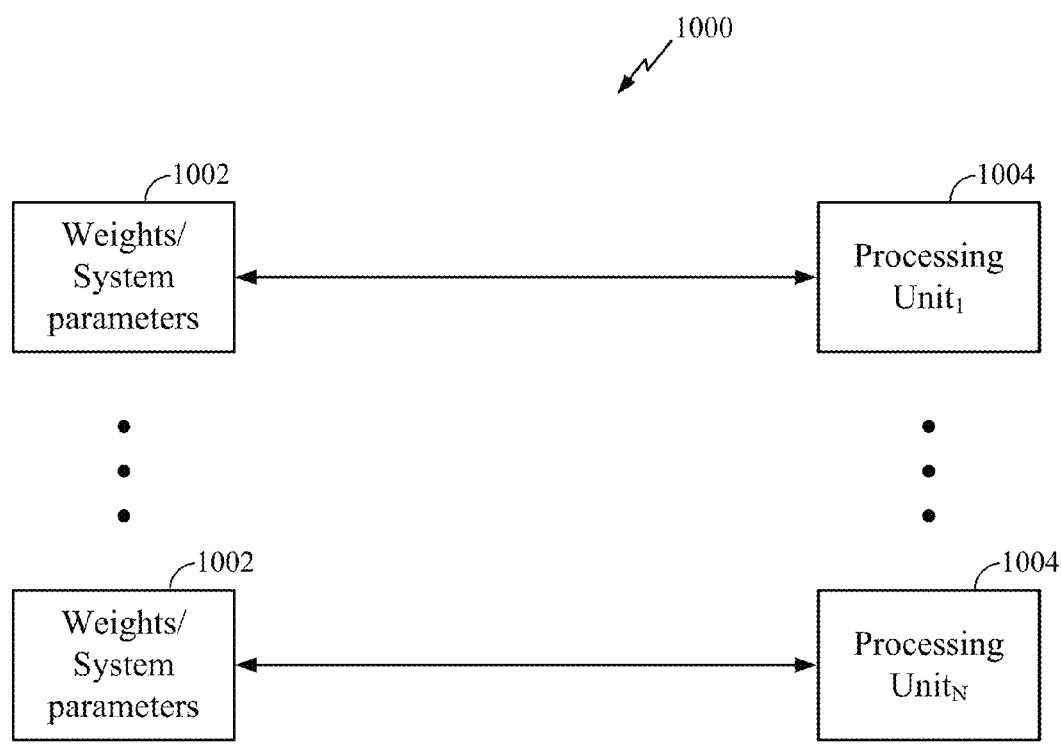
FIG. 10 illustrates an example implementation of designing a neural network based on distributed memories and distributed processing units in accordance with certain aspects of the present disclosure.

FIG. 10 illustrates an example implementation 1000 of the aforementioned synapse conversion. As illustrated in FIG. 10, one memory bank 1002 may be directly interfaced with one processing unit 1004 of a computational network (neural network). Each memory bank 1002 may store variables (neural signals), synaptic weights, and/or system parameters associated with a corresponding processing unit (neural processor) 1004 delays, frequency bin information, and synapse conversion information. In an aspect of the present disclosure, the processing unit 1004 may be configured to convert one or more of, a first set of synapses from a plastic synapse type to a fixed synapse type, a second set of synapses from the fixed synapse type to the plastic synapse type, or a combination thereof.

Figure 11:
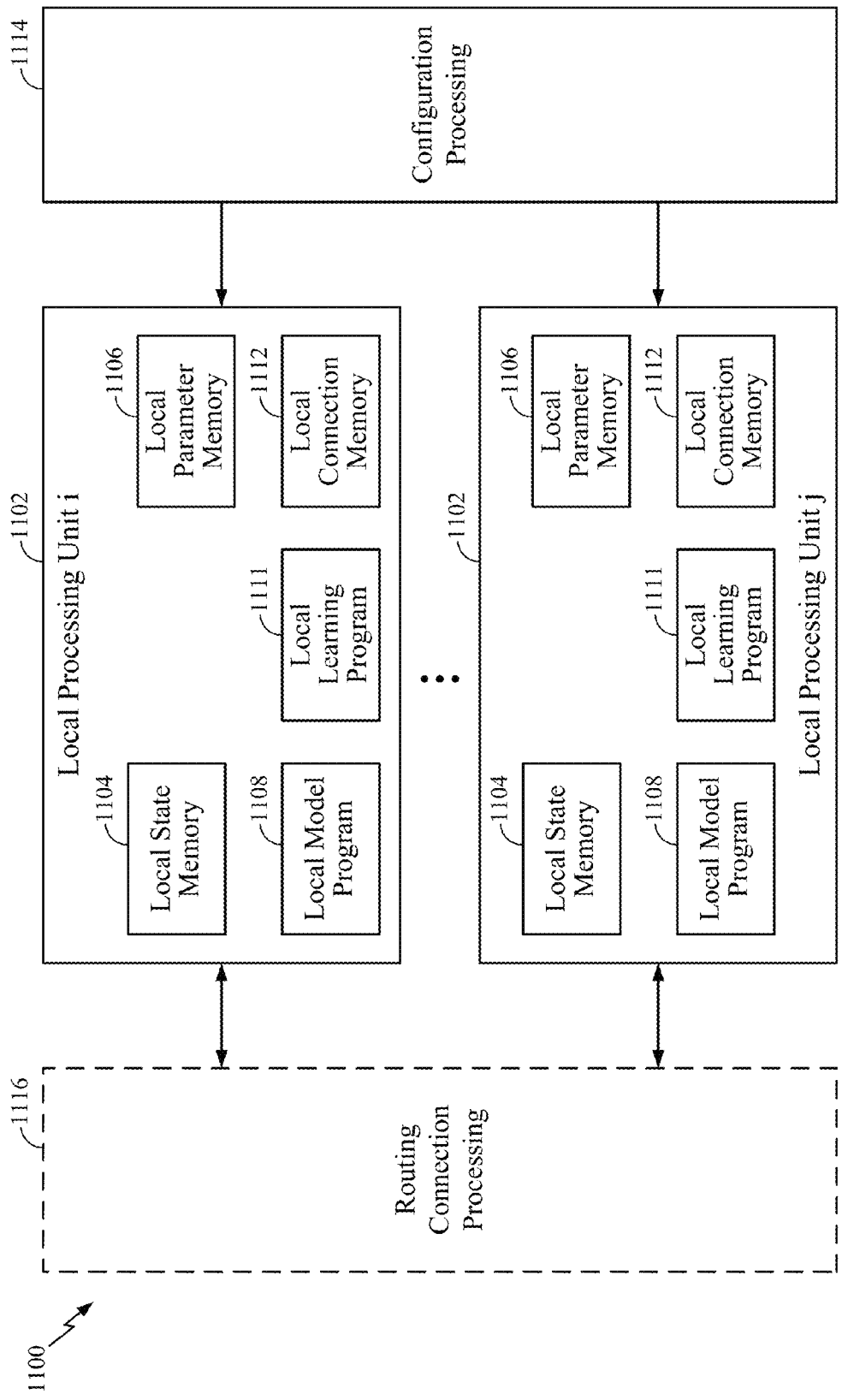
FIG. 11 illustrates an example implementation of a neural network in accordance with certain aspects of the present disclosure.

FIG. 11 illustrates an example implementation of a neural network 1100 in accordance with certain aspects of the present disclosure. As illustrated in FIG. 11, the neural network 1100 may have multiple local processing units 1102 that may perform various operations of methods described above. Each local processing unit 1102 may comprise a local state memory 1104 and a local parameter memory 1106 that store parameters of the neural network. In addition, the local processing unit 1102 may have a local (neuron) model program (LMP) memory 1108 for storing a local model program, a local learning program (LLP) memory 1111 for storing a local learning program, and a local connection memory 1112. Furthermore, as illustrated in FIG. 8, each local processing unit 1102 may be interfaced with a configuration processing unit 1114 for providing configurations for local memories of the local processing unit 1102, and with a routing connection processing unit 1116 that provide routing between the local processing units 1102.

In one configuration, a neuron model is configured for managing synapse plasticity. The neuron model includes a determining means and a converting means. In one aspect, the determining means and converting means may be the general-purpose processor 802, program memory 806, memory block 804, memory 902, interconnection network 904, processing units 909, processing unit 1004, local processing units 1102, and or the routing connection processing units 1116 configured to perform the functions recited. In another configuration, the aforementioned means may be any module or any apparatus configured to perform the functions recited by the aforementioned means.

According to certain aspects of the present disclosure, each local processing unit 802 may be configured to determine parameters of the neural network based upon desired one or more functional features of the neural network, and develop the one or more functional features towards the desired functional features as the determined parameters are further adapted, tuned and updated.

Figure 12:
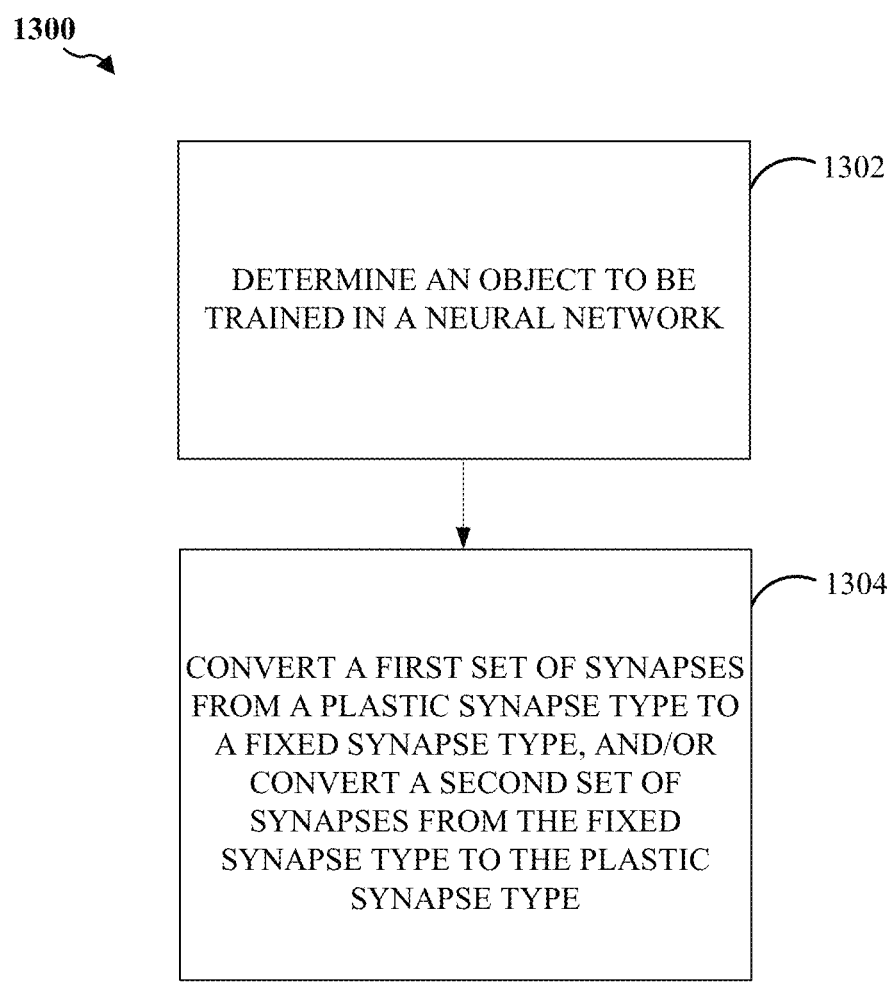
FIG. 12 is a block diagram illustrating a method for converting synapse types in accordance with an aspect of the present disclosure.

FIG. 12 illustrates a method 1200 for converting synapse types. In block 1202, the neural network determines an object to be trained in a neural network. Furthermore, in block 1204 the neural network converts a first set of synapses from a plastic synapse type to a fixed synapse type, and/or converts a second set of synapses from the fixed synapse type to the plastic synapse type. In one configuration, the converting is based on the object to be trained.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for managing synapse plasticity in an artificial neural network, comprising
    determining whether a number of plastic synapse types defined for the artificial neural network is greater than a hardware limit; and
    converting at least one of: a first set of synapses from a plastic synapse type to a fixed synapse type when the first set of synapses is designated as unused, a second set of synapses from the fixed synapse type to the plastic synapse type when the second set of synapses is designated as used, or a combination thereof, when the number of defined plastic synapse types is greater than the hardware limit, such that a number of active plastic synapse types is less than or equal to the hardware limit.

2. The method of claim 1, in which designating a set of synapses as used or unused is based at least in part on one of: a user input, power management, computation time management, a minimum number of synapse instances, a synapse training interval, a synapse type, an overall training need of the artificial neural network, or a combination thereof.

3. The method of claim 1, in which the second set of synapses is designated to be trained in a neural model.

4. The method of claim 1, in which the number of plastic synapse types is pre-defined.

5. The method of claim 1, in which the converting is controlled by a resource manager.

6. The method of claim 1, further comprising changing properties of the first set of synapses and the second set of synapses based on outputs of the artificial neural network and/or performance of the artificial neural network.

7. The method of claim 1, further comprising performing plasticity related computations in a neuron when all outgoing and/or incoming synapses of the neuron are non-plastic synapses.

8. An apparatus for managing synapse plasticity in an artificial neural network, comprising:
a memory unit; and
at least one processor coupled to the memory unit, the at least one processor being configured:
to determine whether a number of plastic synapse types defined for the artificial neural network is greater than a hardware limit; and
to convert at least one of: a first set of synapses from a plastic synapse type to a fixed synapse type when the first set of synapses is designated as unused, a second set of synapses from the fixed synapse type to the plastic synapse type when the second set of synapses is designated as used, or a combination thereof, when the number of defined plastic synapse types is greater than the hardware limit, such that a number of active plastic synapse types is less than or equal to the hardware limit.

9. The apparatus of claim 8, in which the at least one processor is further configured to designate a set of synapses as used or unused based at least in part on one or more of a user input, power management, computation time management, a minimum number of synapse instances, a synapse training interval, a synapse type, an overall training need of the artificial neural network, or a combination thereof.

10. The apparatus of claim 8, in which the second set of synapses is designated to be trained in a neural model.

11. The apparatus of claim 8, in which the number of plastic synapse types is pre-defined.

12. The apparatus of claim 8, in which the converting is controlled by a resource manager.

13. The apparatus of claim 8, in which the at least one processor is further configured to change properties of the first set of synapses and the second set of synapses based on at least one of outputs of the artificial neural network and/or performance of the artificial neural network.

14. The apparatus of claim 8, in which the at least one processor is further configured to perform plasticity related computations in a neuron based on whether all outgoing and/or incoming synapses of the neuron are fixed synapses.

15. An apparatus for managing synapse plasticity in an artificial neural network, comprising means for determining whether a number of plastic synapse types defined for the artificial neural network is greater than a hardware limit of the artificial neural network; and means for converting at least one of: a first set of synapses from a plastic synapse type to a fixed synapse type when the first set of synapses is designated as unused, a second set of synapses from the fixed synapse type to the plastic synapse type when the second set of synapses is designated as used, or a combination thereof, when the number of defined plastic synapse types is greater than the hardware limit, such that a number of active plastic synapse types is less than or equal to the hardware limit.

16. The apparatus of claim 15, in which designating a set of synapses as used or unused is based at least in part on one or more of a user input, power management, computation time management, a minimum number of synapse instances, a synapse training interval, a synapse type, an overall training need of the artificial neural network, or a combination thereof.

17. The apparatus of claim 16, in which the second set of synapses is designated to be trained in a neural model.

18. A non-transitory computer-readable medium having program code recorded thereon for managing synapse plasticity in an artificial neural network, the program code comprising:
program code to determine whether a number of plastic synapse types defined for the artificial neural network is greater than a hardware limit; and
program code to convert at least one of: a first set of synapses from a plastic synapse type to a fixed synapse type when the first set of synapses is designated as unused, a second set of synapses from the fixed synapse type to the plastic synapse type when the second set of synapses is designated as used, or a combination thereof, when the number of defined plastic synapse types is greater than the hardware limit, such that a number of active plastic synapse types is less than or equal to the hardware limit.

19. The non-transitory computer-readable medium of claim 18, in which the program code further comprises code to designate a set of synapses as used or unused based at least in part on one or more of a user input, power management, computation time management, a minimum number of synapse instances, a synapse training interval, a synapse type, an overall training need of the artificial neural network, or a combination thereof.

20. The non-transitory computer-readable medium of claim 18, in which the second set of synapses is designated to be trained in a neural model.

* * * * *